US010373613B2

(12) United States Patent
Wang et al.

(10) Patent No.: US 10,373,613 B2
(45) Date of Patent: Aug. 6, 2019

(54) DUAL-MODE VOICE CONTROL METHOD, DEVICE, AND USER TERMINAL

(71) Applicant: Guangzhou Shenma Mobile Information Technology Co., Ltd., Guangzhou (CN)

(72) Inventors: Yajun Wang, Guangzhou (CN); Tuwenchang Si, Guangzhou (CN); Na Wang, Guangzhou (CN); Yi Peng, Guangzhou (CN); Sishou Zheng, Guangzhou (CN); Xiaoli Fu, Guangzhou (CN); Chao Li, Guangzhou (CN); Wei Kang, Guangzhou (CN); Yining Chen, Guangzhou (CN); Zejun Ma, Guangzhou (CN)

(73) Assignee: Guangzhou Shenma Mobile Information Technology Co., Ltd., Guangzhou (CN)

( * ) Notice: Subject to any disclaimer, the term of this patent is extended or adjusted under 35 U.S.C. 154(b) by 0 days.

(21) Appl. No.: 15/363,990

(22) Filed: Nov. 29, 2016

(65) Prior Publication Data
US 2017/0162196 A1 Jun. 8, 2017

(30) Foreign Application Priority Data
Dec. 8, 2015 (CN) .......................... 2015 1 0900408

(51) Int. Cl.
*G10L 15/05* (2013.01)
*G10L 15/22* (2006.01)
(Continued)

(52) U.S. Cl.
CPC .......... *G10L 15/22* (2013.01); *G06F 3/04817* (2013.01); *G06F 3/04883* (2013.01);
(Continued)

(58) Field of Classification Search
CPC ..................................................... G10L 15/05
See application file for complete search history.

(56) References Cited

U.S. PATENT DOCUMENTS 8,543,397 B1 * 9/2013 Nguyen .............. G06F 3/04883
704/235
9,437,186 B1 * 9/2016 Liu .......................... G10L 15/05
(Continued)

FOREIGN PATENT DOCUMENTS

CN 101345962 1/2009
CN 101854574 10/2010
(Continued)

OTHER PUBLICATIONS

First Notice issued by China State Intellectual Property Office, dated Oct. 10, 2016 for Chinese Patent Application No. 201510900408.9 with search report.
(Continued)

Primary Examiner — Feng-Tzer Tzeng
(74) Attorney, Agent, or Firm — Sheppard Mullin Richter & Hampton LLP

(57) ABSTRACT

A dual-mode voice control method is disclosed. The method may comprise determining whether a user has executed an operation of activating an operate-to-speak stop determination mode in a voice input interface. The method may further comprise, in response to determining that the user has executed the operation of activating the operate-to-speak stop determination mode, determining whether a microphone is in a busy state. The method may further comprise, in response to determining that the microphone is in the busy state, switching a voice mode from a directly-speak automatic stop determination mode to the operate-to-speak stop determination mode. Before the user executes the operation of activating the operate-to-speak stop determination mode, the voice mode is in the directly-speak automatic stop determination mode if the microphone is in the busy state.

18 Claims, 11 Drawing Sheets

(51) Int. Cl.
  *G10L 15/32*     (2013.01)
  *G06F 3/0488*    (2013.01)
  *G06F 3/0481*    (2013.01)
  *G06F 3/0482*        (2013.01)
  *G06F 3/0484*        (2013.01)
  *G06F 3/16*          (2006.01)

(52) U.S. Cl.
  CPC ............ *G10L 15/32* (2013.01); *G06F 3/0482* (2013.01); *G06F 3/04847* (2013.01); *G06F 3/167* (2013.01); *G10L 15/05* (2013.01); *G10L 2015/223* (2013.01); *G10L 2015/228* (2013.01)

(56) References Cited

U.S. PATENT DOCUMENTS

| | | | | |
|---|---|---|---|---|
| 2005/0239487 | A1* | 10/2005 | Glass | .......... H04W 72/005 455/519 |
| 2007/0174058 | A1 | 7/2007 | Burns et al. | |

FOREIGN PATENT DOCUMENTS

| | | |
|---|---|---|
| CN | 104142808 | 11/2014 |
| CN | 104331265 | 2/2015 |
| CN | 104750233 | 7/2015 |
| RU | 2340930 C2 | 12/2008 |
| RU | 2466468 C1 | 11/2012 |
| WO | 1995/008821 A1 | 3/1995 |
| WO | 1996/027185 A1 | 9/1999 |

OTHER PUBLICATIONS

Second Notice issued by China State Intellectual Property Office, dated Mar. 2, 2017 for Chinese Patent Application No. 201510900408.9 with search report.
Search Report for Russia Application No. 2016147907, dated Feb. 2, 2018, 2 pages.
Office Action for Russia Application No. 2016147907, dated Feb. 2, 2018, 6 pages.

* cited by examiner

DUAL-MODE VOICE CONTROL METHOD, DEVICE, AND USER TERMINAL

CROSS REFERENCE TO RELATED APPLICATION

The present application is based on and claims the benefit of priority to Chinese Application No. 201510900408.9, filed Dec. 8, 2015, the entire contents of which are incorporated herein by reference.

TECHNICAL FIELD

The present disclosure relates to the field of control technology, and, in particular, to dual-mode voice control methods, devices, and user terminals.

BACKGROUND

With continuous popularization and development of mobile terminals, accessing the Internet with the mobile terminals has gradually become a trend. At present, many mobile terminals support a voice recognition function, which has been implemented mainly in the following two ways: (1) pressing a microphone button to start voice input, and releasing the microphone button to end voice input; and (2) using VAD (Voice Activity Detection) automatic recognition, and start voice input after entering a voice input interface.

The above two voice input recognition methods correspond to operation habits of different users and are applied to different scenarios respectively. The exiting various browsers and application software only support one of the implementation methods, and does not support mode selection and switching in the application scenarios where the voice input methods are both supported.

SUMMARY

The present disclosure provides dual-mode voice control methods, devices, and user terminals, solving the problems described in the existing browsers and applications to achieve flexible selection and switching between two voice input modes of operate-to-speak and directly-speak.

In a first aspect, some embodiments of the present disclosure provide a dual-mode voice control method. The method may comprise determining whether a user has executed an operation of activating an operate-to-speak stop determination mode in a voice input interface; in response to determining that the user has executed the operation of activating the operate-to-speak stop determination mode, determining whether a microphone is in a busy state; and in response to determining that the microphone is in the busy state, switching a voice mode from a directly-speak automatic stop determination mode to the operate-to-speak stop determination mode, wherein before the user executes the operation of activating the operate-to-speak stop determination mode, the voice mode is in the directly-speak automatic stop determination mode if the microphone is in the busy state.

In another aspect, some embodiments of the present disclosure provide that: determining whether the user has executed the operation of activating the operate-to-speak stop determination mode in the voice input interface may comprise determining whether the user has executed a start operation of activating the operate-to-speak stop determination mode in the voice input interface; in response to detecting the start operation, monitoring the time length during which the user executes the start operation; and in response to determining that the time length reaches a preset threshold, determining that the operation of activating the operate-to-speak stop determination mode in the voice input interface detected.

In another aspect, some embodiments of the present disclosure provide: determining whether the user has executed the operation of activating the operate-to-speak stop determination mode in the voice input interface may comprise determining whether the user has executed a start operation of activating the operate-to-speak stop determination mode in the voice input interface; in response to determining the start operation, determining whether the microphone is in an idle state; and in response to determining that the microphone is in the idle state, setting the directly-speak automatic stop determination mode as the voice mode, monitoring the time length during which the user executes the start operation, and in response to determining that the time length reaches a preset threshold, determining that the operation of activating the operate-to-speak stop determination mode in the voice input interface is detected.

In another aspect, some embodiments of the present disclosure provide that the dual-mode voice control method may further include: acquiring voice information expressed by the user in the voice input interface; monitoring an operation of ending the operate-to-speak stop determination mode by the user in the voice input interface; in response to determining that the user has executed the operation of ending the operate-to-speak stop determination mode, determining whether the directly-speak automatic stop determination mode or the operate-to-speak stop determination mode is currently active; in response to determining that the directly-speak automatic stop determination mode is currently active, continuing acquiring the voice information expressed by the user; and in response to determining that the operate-to-speak stop determination mode is currently active, stopping acquiring the voice information expressed by the user.

In another aspect, some embodiments of the present disclosure provide a dual-mode voice control method. The method may include determining whether a user has executed a start operation of an operation of activating an operate-to-speak stop determination mode in a voice input interface; in response to detecting the start operation, determining whether a microphone is in an idle state; in response to determining that the microphone is in the idle state, setting a directly-speak automatic stop determination mode as the voice mode, and monitoring the time length during which the user executes the start operation; and in response to determining that the time length reaches a preset threshold, determining that the operation of activating the operate-to-speak stop determination mode in the voice input interface is detected, and switching the voice mode from the directly-speak automatic stop determination mode to the operate-to-speak stop determination mode.

In another aspect, some embodiments of the present disclosure provide a dual-mode voice control device operable in a user terminal. The device may comprise a processor and a non-transitory computer-readable memory storing instructions that, when executed by the processor, cause the processor to: monitor whether a user has executed an operation of activating an operate-to-speak stop determination mode in a voice input interface; and in response to determining that the user has executed the operation of activating the operate-to-speak stop determination mode, determine whether a microphone is in a busy state, and in response to determining that the microphone is in the busy state, switch a voice mode from a directly-speak automatic stop determination mode to the operate-to-speak stop determination mode, wherein before the user executes the operation of activating the operate-to-speak stop determination mode, the voice mode is in the directly-speak automatic stop determination mode if the microphone is in the busy state.

In another aspect, some embodiments of the present disclosure provide a dual-mode voice control device operable in a user terminal. The device may comprise a processor and a non-transitory computer-readable memory storing instructions that, when executed by the processor, cause the processor to: determine whether a user has executed a start operation of activating an operate-to-speak stop determination mode in a voice input interface; and in response to determining the start operation, determine whether a microphone is in an idle state, in response to determining that the microphone is in the idle state, set a directly-speak automatic stop determination mode as the voice mode, monitor the time length during which the user executes the start operation, and when the time length reaches a preset threshold, determine that the operation of activating the operate-to-speak stop determination mode in the voice input interface is detected, and switch the voice mode from the directly-speak automatic stop determination mode to the operate-to-speak stop determination mode.

In another aspect, some embodiments of the present disclosure provide a user terminal. The terminal may include a microphone, a touch screen, a non-transitory computer-readable memory, and a processor. The memory may store instructions that, when executed by the processor, cause the user terminal to: monitor whether a user has executed an operation of activating an operate-to-speak stop determination mode in a voice input interface; and in response to determining that the user has executed the operation of activating the operate-to-speak stop determination mode, determine whether a microphone is in a busy state, and in response to determining that the microphone is in the busy state, switch a voice mode from a directly-speak automatic stop determination mode to the operate-to-speak stop determination mode, wherein before the user executes the operation of activating the operate-to-speak stop determination mode, the voice mode is in the directly-speak automatic stop determination mode if the microphone is in the busy state.

In another aspect, some embodiments of the present disclosure provide a user terminal. The terminal may include a microphone, a touch screen, a non-transitory computer-readable memory, and a processor. The memory may store instructions that, when executed by the processor, cause the user terminal to: determine whether a user has executed a start operation of activating an operate-to-speak stop determination mode in a voice input interface; and in response to determining the start operation, determine whether a microphone is in an idle state, in response to determining that the microphone is in the idle state, set a directly-speak automatic stop determination mode as the voice mode, monitor the time length during which the user executes the start operation, and when the time length reaches a preset threshold, determine that the operation of activating the operate-to-speak stop determination mode in the voice input interface is detected, and switch the voice mode from the directly-speak automatic stop determination mode to the operate-to-speak stop determination mode.

The dual-mode voice control method, the dual-mode voice control device and the user terminal provided by some embodiments of the present disclosure are applicable to the application scenarios where both voice input modes of "operate-to-speak" and "directly-speak" are supported, the directly-speak automatic stop determination mode or the operate-to-speak stop determination mode can be selected or switched flexibly and reliably by monitoring the operation behavior of the user and the state of the microphone, so that voice inputs of users with different behavioral habits can be adapted, the convenience and the flexibility of user voice input are significantly improved, and the voice input experience is improved.

BRIEF DESCRIPTION OF THE DRAWINGS

Preferred and non-limiting embodiments of the disclosure may be more readily understood by referring to the accompanying drawings in which.

It is to be understood that the foregoing general description and the following detailed description are exemplary and explanatory only, and are not restrictive of the disclosure, as claimed.

DETAILED DESCRIPTION OF SOME EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

It should also be noted that the terms including "first", "second" and the like in the descriptions, claims and accompanying drawings of the present disclosure are used for distinguishing similar objects, rather than describing specific sequences or priorities. It should be understood that the data can be exchanged when appropriate, so that some embodiments of the present disclosure described herein can be implemented in sequences other than those illustrated or described herein. Moreover, the terms "include", "have" and any variant thereof are intended to cover non-exclusive inclusion, for example, the processes, methods, systems, products or devices including a series of steps or units are not limited to those steps or units listed clearly, but may include those not listed or other inherent steps or units of the processes, methods, products or devices.

A dual-mode voice control method and a dual-mode voice control device provided by some embodiments of the present disclosure may be applied to a user terminal 100. In some embodiments of the present disclosure, the user terminal 100 is mobile terminal equipment, e.g., a smart phone, a tablet computer, an electronic book reader, a portable laptop computer, a vehicle-mounted computer, a wearable mobile terminal, etc.

Figure 1:
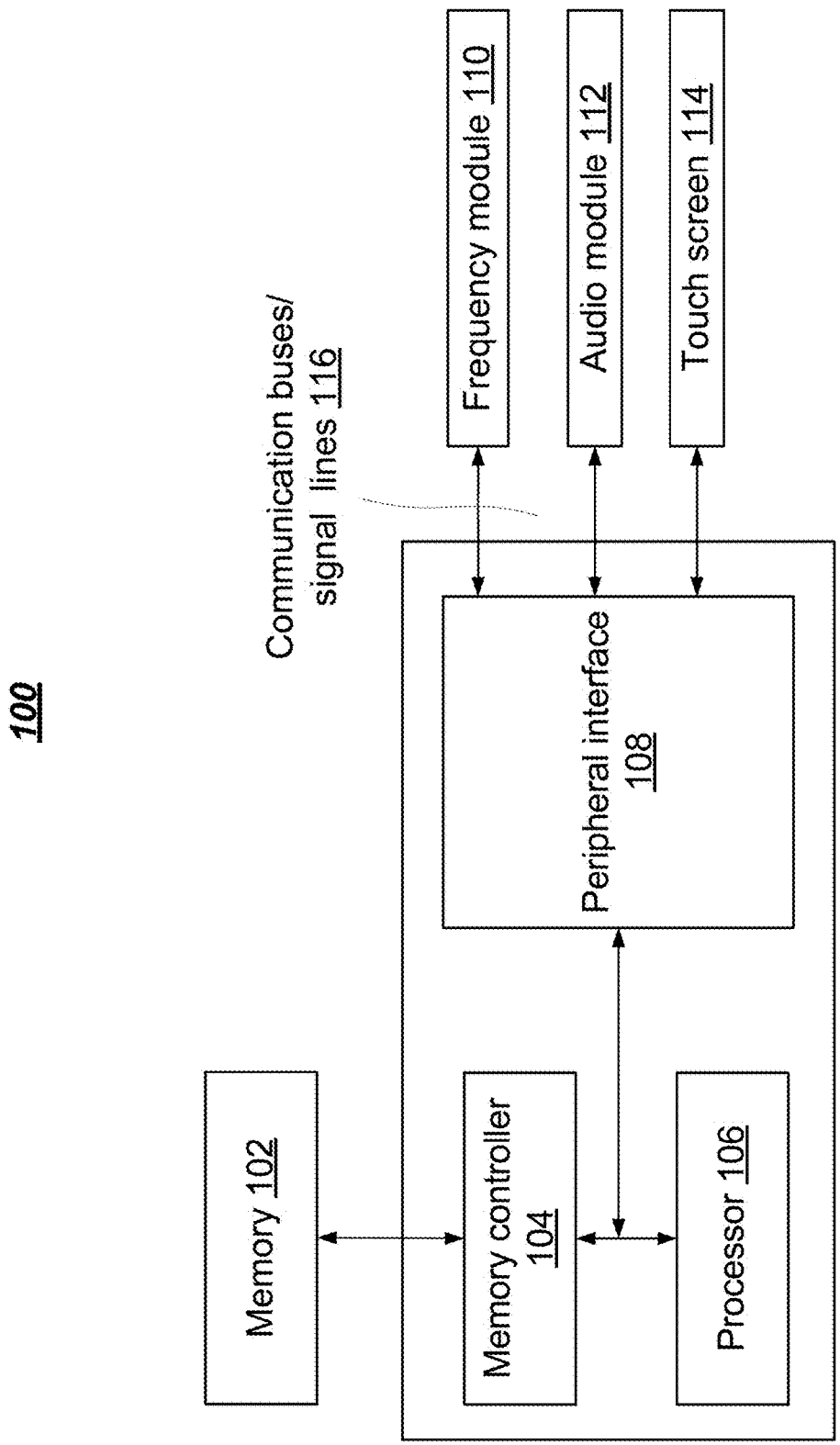
FIG. 1 shows a structure block diagram of a user terminal, consistent with exemplary embodiments of the present disclosure.

FIG. 1 shows a structure block diagram of a user terminal 100, consistent with exemplary embodiments of the present disclosure. As shown in FIG. 1, the user terminal 100 includes a memory 102, a memory controller 104, one or more (though only one is shown in the figure) processors 106, a peripheral interface 108, a radio frequency module 110, an audio module 112, a touch screen 114, etc. The components communicate with each other via one or more communication buses/signal lines 116.

The memory 102 may be used for storing software programs and modules, e.g., corresponding program instructions/modules of a dual-mode voice control method and device disclosed herein. And the processor 106 runs the software programs and the modules stored in the memory 102 to execute various functional applications, e.g., the dual-mode voice control disclosed herein.

The memory 102 may include a high-speed random memory, and/or a nonvolatile memory, e.g., one or more magnetic storage devices, a flash memory, or other nonvolatile solid-state memory. The processor 106 and other possible components may access the memory 102 under the control of the memory controller 104.

The peripheral interface 108 couples various input/output devices to the processor 106 and the memory 102. In some embodiments, the peripheral interface 108, the processor 106 and the memory controller 104 may be implemented in a single chip. In some other embodiments, they may be implemented by independent chips respectively.

The radio frequency module 110 is used for receiving and transmitting electromagnetic waves, and implementing mutual conversion between the electromagnetic waves and electrical signals, thereby communicating with a communication network or other equipment.

The audio module 112 provides an audio interface for a user, and may include one or more microphones, one or more loudspeakers, and an audio circuit.

The touch screen 114 provides an output and input interface between the user terminal 100 and the user. For example, the touch screen 114 displays voice input conditions, web page contents, and the like to the user.

It could be understood that the structure shown in FIG. 1 is merely schematic, and the user terminal 100 may also include more or fewer components than in FIG. 1, or has a different configuration from that in FIG. 1. The components shown in FIG. 1 may be implemented by hardware, software, or a combination thereof.

Some embodiments of the present disclosure provide a dual-mode voice control based on mobile application scenarios, which can better adapt to user behavior for voice input. Accordingly, users can speak directly and/or operate to input voice. By monitoring the behavior of the user and the state of the microphone, the two voice input modes can be individually selected and switched flexibly to provide a more convenient and reliable voice input service.

In some embodiments of the present disclosure, according to the voice input mode selected by a user, the voice mode mainly includes an operate-to-speak stop determination mode and a directly-speak automatic stop determination mode. The stop determination rule of the operate-to-speak stop determination mode is that a stop (e.g., a cease of input operation) is determined when an operation of ending the operate-to-speak stop determination mode (as opposed to an operation of activating the operate-to-speak stop determination mode) is detected. For example, the stop is determined when detecting that a finger or an electromagnetic pen releases a press-to-speak button, an uncheck-microphone button is clicked, the microphone button is slided to a starting point, and the like, regardless of whether the user carries out language description. Using the operation of pressing down the press-to-speak button to start a voice input and releasing the press-to-speak button to end the voice input as an example, in this operate-to-speak stop determination mode, as long as the user continues pressing down the speaking button, the voice mode is in the state of constantly acquiring voice information of the user, regardless whether the user carries out a voice input.

The stop determination rule of the directly-speak automatic stop determination mode is that a stop (e.g., cease of input operation) is determined if no voice input is detected for a certain time length, regardless of whether the user carries out an operation.

Figure 2:
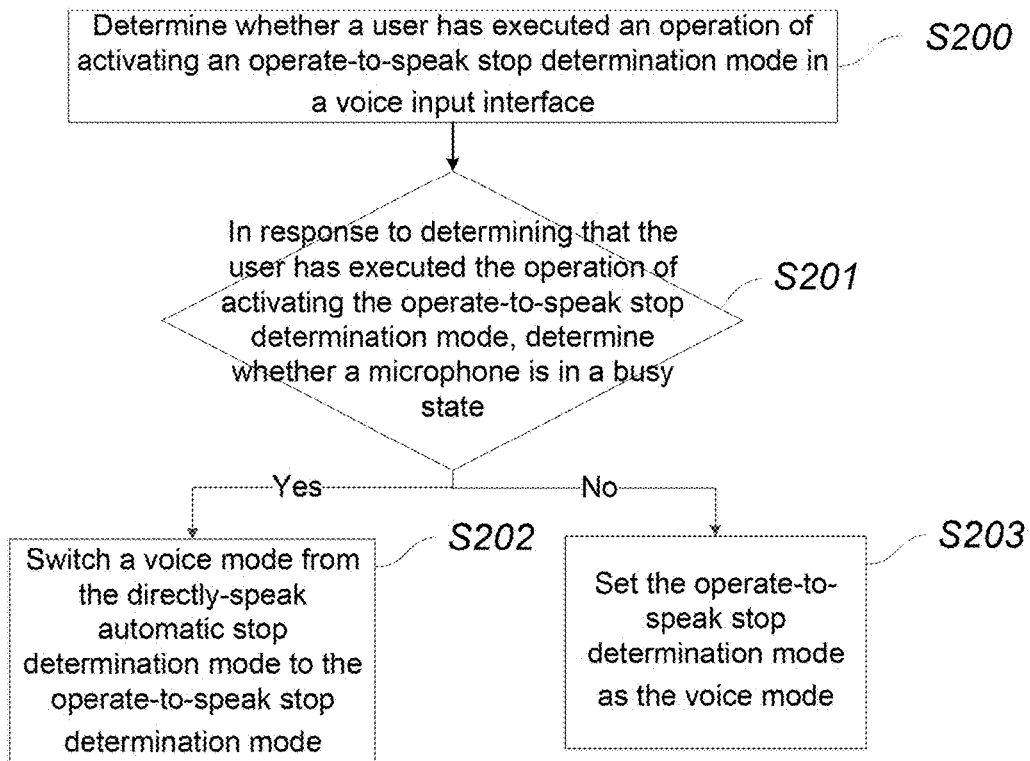
FIG. 2 shows a schematic flow diagram of a dual-mode voice control method, consistent with exemplary embodiments of the present disclosure.

FIG. 2 shows a dual-mode voice control method, consistent with exemplary embodiments of the present disclosure. Referring to FIG. 2, a control method is disclosed. The method may direct to a browser in a user terminal or a voice function module such as an audio module in application software. The method includes the following steps.

Step S200 includes: determining whether a user has executed an operation of activating an operate-to-speak stop determination mode in a voice input interface.

A user in a search interface can select whether to enter a voice input interface. A simple way of entering the voice input interface can be defined, e.g., by the user clicking a "voice input" button on a screen interaction interface, performing a predefined gesture such as a gesture "V", etc. Of course, directly entering the voice input interface can be the default. Described above is an example of entering the voice input interface, and it can be understood that the implementation of the preset disclosure is not limited thereto.

After entering the voice input interface, the user can directly speak to input voice or carry out an operation to input voice according to habits without selecting a voice input mode.

The operation of activating the operate-to-speak stop determination mode by the user refers to an operation directly triggering the operate-to-speak stop determination mode. There may be many operations of activating the operate-to-speak stop determination mode, and will be illustrated exemplarily in the following description.

Step S201 includes: in response to determining that the user has executed the operation of activating the operate-to-speak stop determination mode, determining whether a microphone is in a busy state, and if so, step S202 is executed: switching a voice mode from the directly-speak automatic stop determination mode to the operate-to-speak stop determination mode. Before the user executes the operation of activating the operate-to-speak stop determination mode, if the microphone is in the busy state, the voice mode is the directly-speak automatic stop determination mode. Otherwise, step S203 is executed: setting the operate-to-speak stop determination mode as the voice mode.

In some embodiments, the microphone in the busy state indicates a recording state in which the microphone receives user's voices, and correspondingly, the microphone in an idle state indicates a non-recording state when the microphone does not receive user's voices. In order to allow the user to conveniently recognizing the state of the microphone, a microphone recording icon appears in the middle of a screen to indicate the busy state, as shown in FIGS. 14, 15, 17, 19, 20, 22 and 23.

Whether the microphone is in the busy state can be determined in many methods. In one exemplary implementation, the user terminal includes a microphone state machine for acquiring the state of the microphone, the user terminal sends a microphone state acquisition instruction to the microphone state machine when determining that the user has executed the operation of activating the operate-to-speak stop determination mode, and the microphone state machine acquires the state of the microphone.

In some embodiments, when the microphone is in the busy state, the microphone is in a state of receiving and recording user's voice, and the voice mode is in a directly-speak automatic stop determination mode or an operate-to-speak stop determination mode. If it is determined that the user has executed the operation of activating the operate-to-speak stop determination mode when the microphone is in the busy state, it indicates that the voice mode was not in the operate-to-speak stop determination mode before the operation of activating the operate-to-speak stop determination mode is executed. Thus, when determining that the user has executed the operation of activating the operate-to-speak stop determination mode when the microphone is in the busy state, the current voice mode should be in the directly-speak automatic stop determination mode. When detecting that the user has executed the operation of activating the operate-to-speak stop determination mode in the directly-speak automatic stop determination mode, it can be determined that the user prepares for voice mode switching, and then the voice mode is switched from the directly-speak automatic stop determination mode to the operate-to-speak stop determination mode to implement mode switching, adapting to the voice input behavior of the user. Correspondingly, if the microphone is in an idle state when detecting that the user has executed the operation of activating the operate-to-speak stop determination mode in the directly-speak automatic stop determination mode, it directly enters the operate-to-speak stop determination mode.

Various methods may be used to determine whether the user has executed the operation of activating the operate-to-speak stop determination mode in the voice input interface. Two determination methods are provided below, and it can be understood that the implementation of the present disclosure is not limited thereto.

Figure 3:
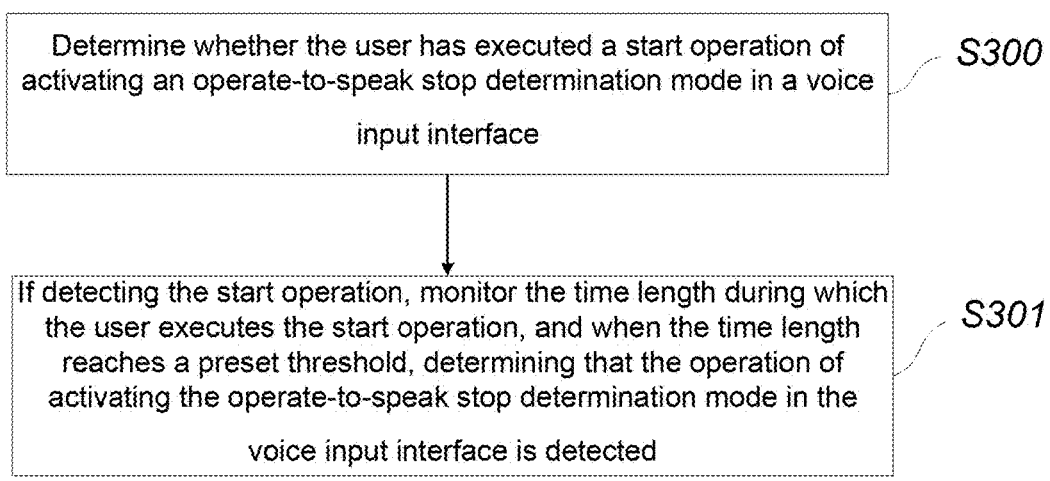
FIG. 3 shows a schematic flow diagram of another dual-mode voice control method, consistent with exemplary embodiments of the present disclosure.

In the first determination method, as shown in FIG. 3, the monitoring whether a user has executed an operation of activating an operate-to-speak stop determination mode in a voice input interface of step 200 described above includes the following steps:

Step S300: determining whether the user has executed a start operation of activating an operate-to-speak stop determination mode in a voice input interface.

Figure 15:
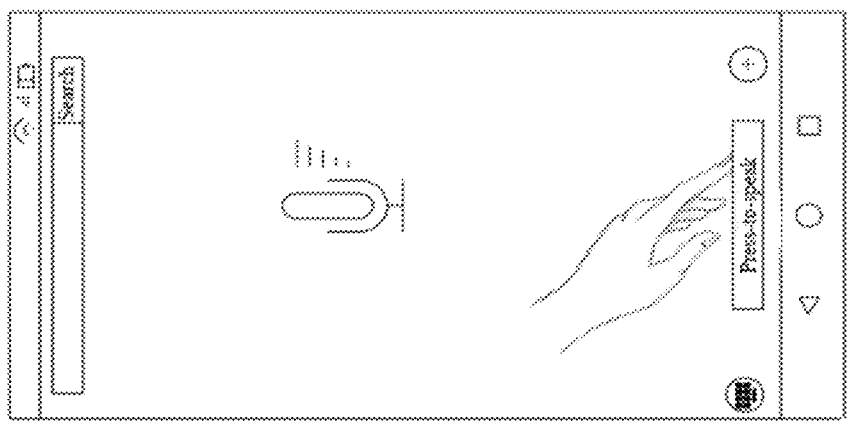
FIG. 15 shows a schematic diagram of an interactive interface for starting the operate-to-speak stop determination mode in a busy state of the microphone, consistent with exemplary embodiments of the present disclosure.
Figure 13:
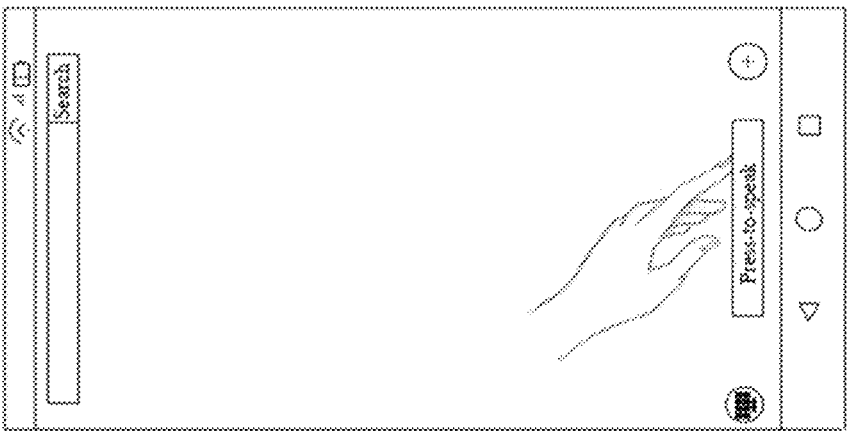
FIG. 13 shows a schematic diagram of an interactive interface for starting an operate-to-speak stop determination mode in an idle state of a microphone, consistent with exemplary embodiments of the present disclosure.
Figure 16:
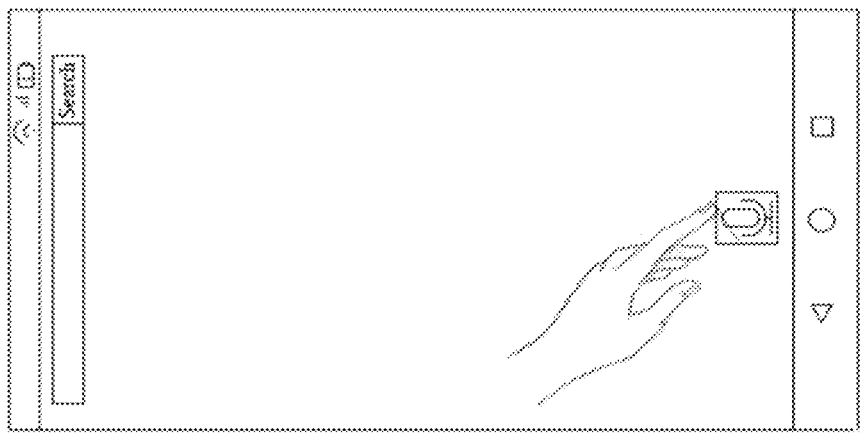
FIG. 16 shows a schematic diagram of another interactive interface for starting the operate-to-speak stop determination mode in the idle state of the microphone, consistent with exemplary embodiments of the present disclosure.

In some embodiments, the user executes the start operation of activating the operate-to-speak stop determination mode, for example, the start operation is a press-down operation to a press-to-speaker button, as shown in FIGS. 13 and 15; for another example, the start operation is a click operation to a microphone button, as shown in FIG. 16; for a further example, the start operation is a sliding operation from an initial position to a final position, e.g., sliding from left to right, etc.

Figure 18:
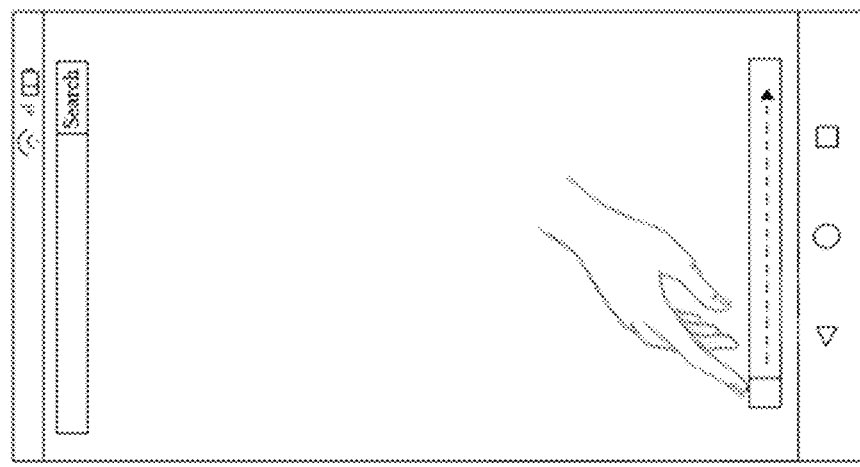
FIG. 18 shows a schematic diagram of another interactive interface for starting the operate-to-speak stop determination mode in the idle state of the microphone, consistent with exemplary embodiments of the present disclosure.
Figure 21:
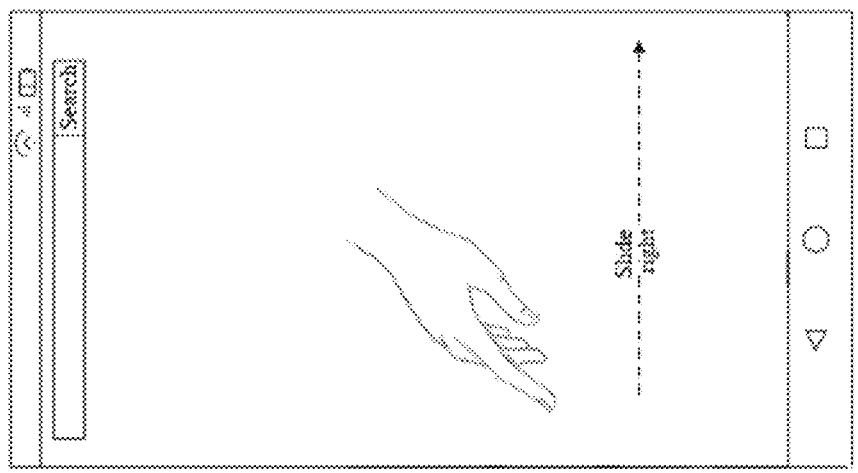
FIG. 21 shows a schematic diagram of another interactive interface for starting the operate-to-speak stop determination mode in the idle state of the microphone, consistent with exemplary embodiments of the present disclosure.
Figure 20:
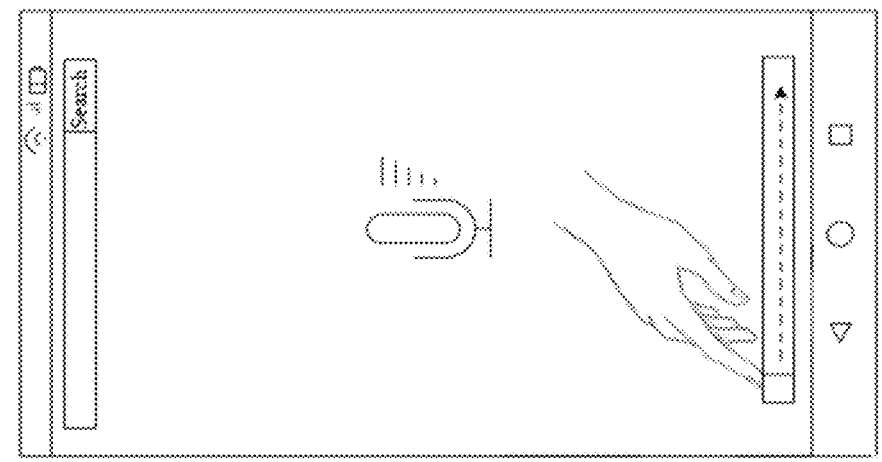
FIG. 20 shows a schematic diagram of another interactive interface for starting the operate-to-speak stop determination mode in the busy state of the microphone, consistent with exemplary embodiments of the present disclosure.
Figure 23:
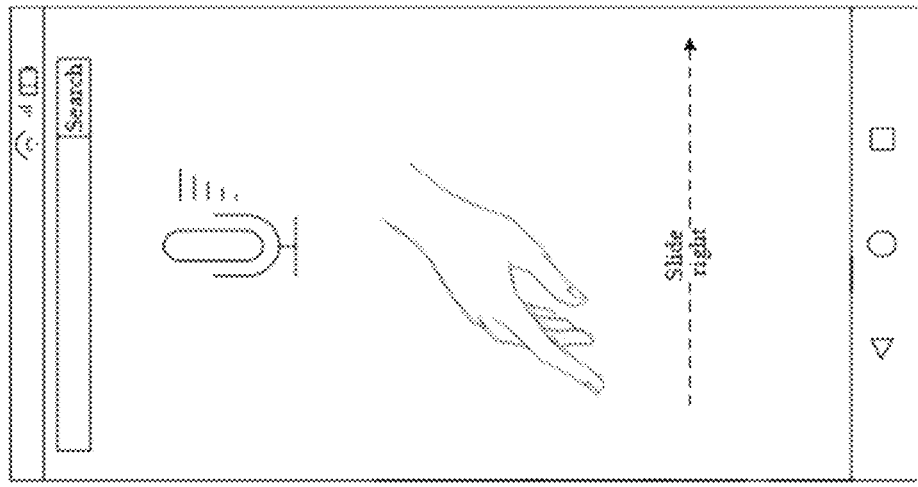
FIG. 23 shows a schematic diagram of another interactive interface for starting the operate-to-speak stop determination mode in the busy state of the microphone, consistent with exemplary embodiments of the present disclosure.

The start operation of activating the operate-to-speak stop determination mode is implemented in various ways from the initial position to the final position, for example, the start operation is a gesture, e.g., the finger of the user slides from any position of the left side of the screen to any position of the right side of the screen, as shown in FIGS. 21 and 23. For another example, the screen has a microphone button and a sliding bar for sliding the microphone button, the start operation of activating the operate-to-speak stop determination mode is to drag the microphone button from one position to another in the sliding bar, as shown in FIGS. 18 and 20.

Figure 17:
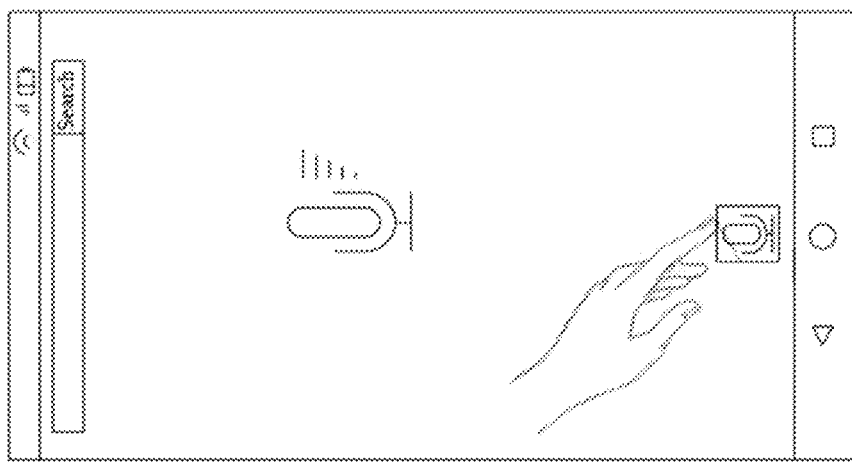
FIG. 17 shows a schematic diagram of another interactive interface for ending the operate-to-speak stop determination mode, consistent with exemplary embodiments of the present disclosure.

The microphone button may have multiple forms. For example, the microphone button may appear as a microphone button icon, e.g., a microphone icon is set in the middle of an area, and voice input can begin by long-pressing or selecting the microphone icon, as shown in FIGS. 16 and 17. For another example, the microphone button may appear as a long-press button, of which a press-to-speak label or the like is marked in a rectangular button, and voice input can begin by long-pressing the button, as shown in FIGS. 13 and 15.

During implementation, if the user selects an operate-to-speak voice input mode, the user may execute the start operation of activating the operate-to-speak stop determination mode; when the user executes the start operation of activating the operate-to-speak stop determination mode, the user terminal monitors the start operation of activating the operate-to-speak stop determination mode, e.g., clicking a microphone button, pressing down a long-press button, dragging the microphone button, sliding on the screen, etc., in which the finger of the user or the electromagnetic pen operated by the user touches the screen or the microphone button on the screen. Thus, the action behavior that the finger of the user or the electromagnetic pen operated by the user clicks the microphone button, presses down the long-press button, drags the microphone button or slides on the screen can be selected as the start operation to be monitored, or the contact action between the finger of the user or the electromagnetic pen operated by the user and the screen or the microphone button on the screen can be selected as the start operation to be monitored.

It can be known from the above description that the start operation of activating the operate-to-speak stop determination mode is used as a node for screening the user behavior in some embodiments.

Step S301 includes: if detecting the start operation, monitoring the time length during which the user executes the start operation, and when the time length reaches a preset threshold, determining that the operation of activating the operate-to-speak stop determination mode in the voice input interface is detected.

In some embodiments, detecting the start operation indicates the onset of the user's operation of activating the operate-to-speak stop determination mode. Taking the press-to-speak operation mode as an example, detecting the start operation in this step indicates the moment when the finger of the user presses down the microphone button, and the user did not operate the microphone button before the finger presses down the microphone button.

Figure 14:
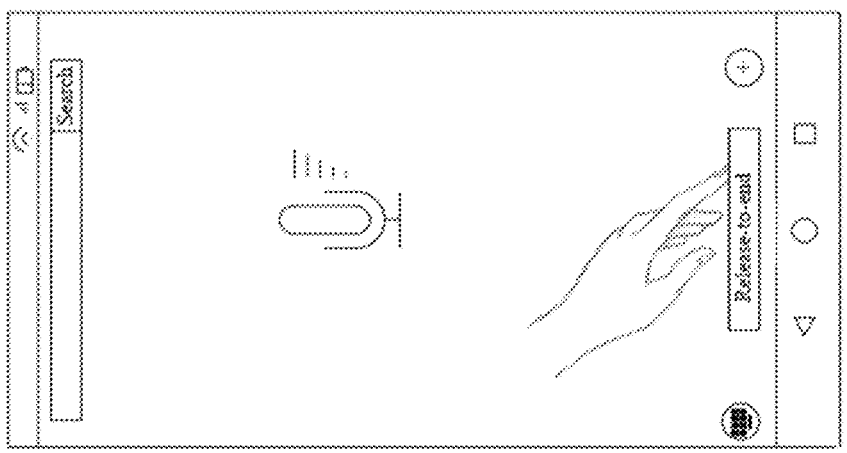
FIG. 14 shows a schematic diagram of an interactive interface for ending the operate-to-speak stop determination mode, consistent with exemplary embodiments of the present disclosure.

In view of possible mis-operations in practical applications, taking the example that the user long-presses the microphone button for voice input (as shown in FIG. 13) and releases the microphone button to end voice input (as shown in FIG. 14), the situation that the user transiently operates the microphone button exists in application. In such situation, if detecting that the user has executed the start operation of activating the operate-to-speak stop determination mode, e.g., when pressing down the microphone button, it is determined that the operation of activating the operate-to-speak stop determination mode in the voice input interface is detected, and that the operate-to-speak stop determination mode is set as the voice mode. Similarly, when the finger of the user releases the microphone button, it is determined to end the voice input according to the stop determination rule of the operate-to-speak stop determination mode. Such process may cause the problem that the information described by the user voice cannot be completely acquired.

Thus, to overcome the limitation in the prior art, in some embodiments, a mis-operation is determined by monitoring the time length that takes the user to execute the start operation, e.g., the time length during which the user presses down the microphone button. When the time length that takes the user to execute the start operation, e.g., the time length during which the user presses down the microphone button, is determined to reach a preset threshold, a correct operation can be determined. Then, the user can be determined to have executed the operation of activating the operate-to-speak stop determination mode in the voice input interface, and the state of the microphone is determined. If the microphone is in a busy state, the voice mode is switched from the directly-speak automatic stop determination mode to the operate-to-speak stop determination mode; and if the microphone is in an idle state, the operate-to-speak stop determination mode is set as the voice mode. On the other hand, if the time length that takes the user to execute the start operation does not reach the preset threshold, it is determined that the user has executed a mis-operation instead of the operation of activating the operate-to-speak stop determination mode in the voice input interface, and the voice mode is not switched.

Figure 4:
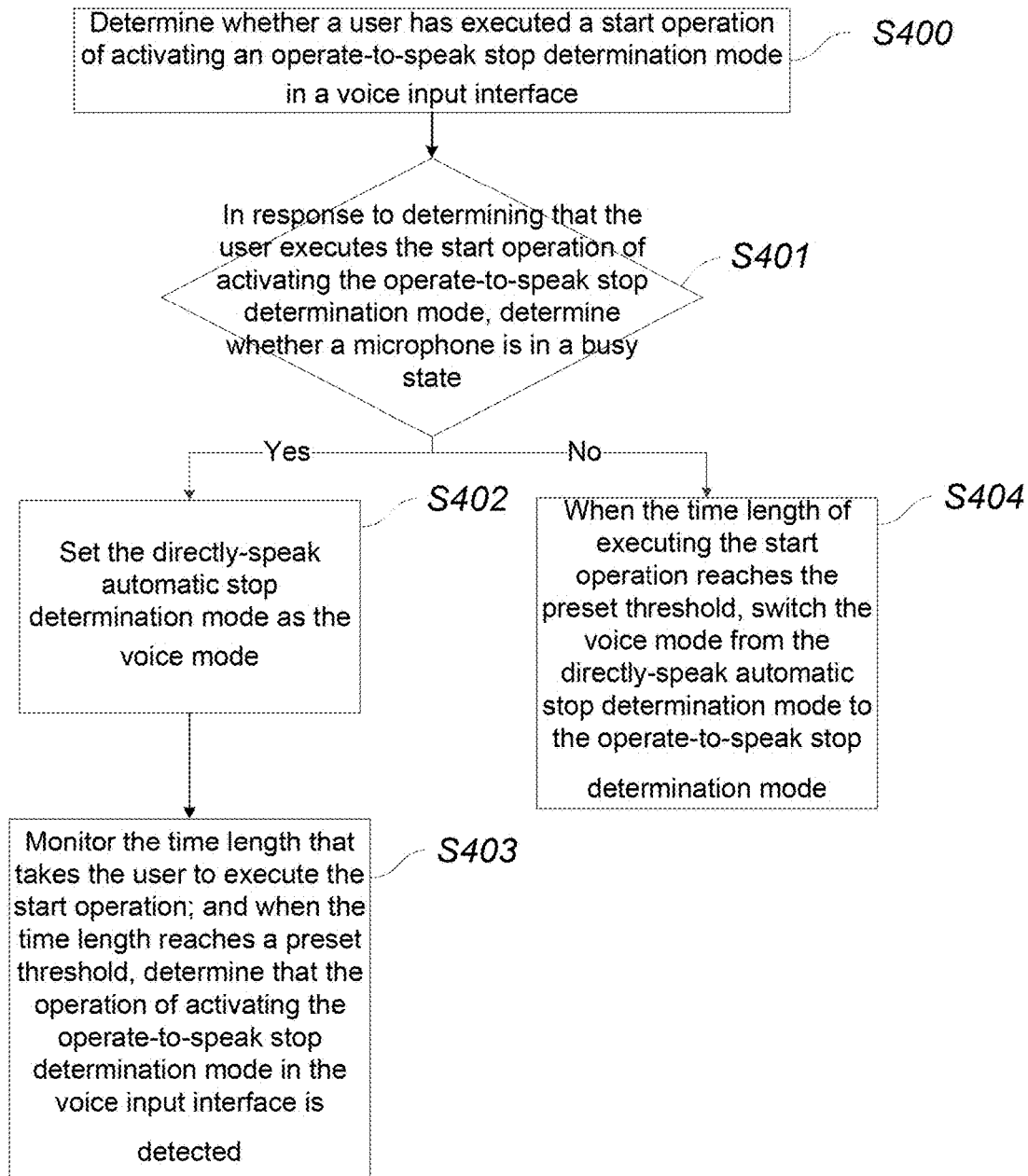
FIG. 4 shows a schematic flow diagram of another dual-mode voice control method, consistent with exemplary embodiments of the present disclosure.

In the second determination method, as shown in FIG. 4, the monitoring whether a user has executed an operation of activating an operate-to-speak stop determination mode in a voice input interface of step 200 described above includes the following steps:

Step S400: determining whether a user has executed a start operation of activating operate-to-speak stop determination mode in a voice input interface.

In this step, the user may execute the start operation similarly to that in step S300, which is not repeated here.

Step S401 includes: in response to determining that the user has executed the start operation of activating the operate-to-speak stop determination mode, determining whether the microphone is in an idle state. If yes, step S402 is executed: setting the directly-speak automatic stop determination mode as the voice mode; after which step S403 is executed: monitoring the time length that takes the user to execute the start operation; and when the time length reaches a preset threshold, determining that the operation of activating the operate-to-speak stop determination mode in the voice input interface is detected. Otherwise, step S404 is executed: when the time length of executing the start operation reaches the preset threshold, switching the voice mode from the directly-speak automatic stop determination mode to the operate-to-speak stop determination mode.

In this step, monitoring the start operation is the same as that in step S301, which is not repeated here.

The idle state of the microphone indicates a non-recording state when user's voice description is not received. In some embodiments, no microphone recording icon is in the screen when the microphone is in the idle state.

In some embodiments, if the microphone is in the idle state, the current voice mode is neither in the directly-speak automatic stop determination mode, nor in the operate-to-speak stop determination mode. Monitoring the start operation of activating the operate-to-speak stop determination mode in the idle state of the microphone indicates that the user prepares for voice input.

Based on the same consideration as in step S301, user's mis-operation may exist. Thus, in this step, when the user executing the start operation is detected, e.g., when the microphone button is pressed down and the microphone is in the idle state, the directly-speak automatic stop determination mode is set as the voice mode, and then the voice information described by the user is acquired in the directly-speak automatic stop determination mode, so that any interference caused by the mis-operation can be avoided, and the voice information described by the user can be completely acquired.

When the start operation is detected and the microphone is in the idle state, a mis-operation is determined by monitoring the time length that takes the user to execute the start operation, e.g., the time length that the user presses down the microphone button, while the directly-speak automatic stop determination mode is set as the voice mode. When the time length that takes the user to execute the start operation, e.g., the time length during which the user presses down the microphone button, is determined to reach a preset threshold, the operation can be determined not being a mis-operation. Then, it is determined that the user has executed the operation of activating the operate-to-speak stop determination mode in the voice input interface, and the state of the microphone is determined. If the microphone is in a busy state, the voice mode is switched from the directly-speak automatic stop determination mode to the operate-to-speak stop determination mode; and if the microphone is in an idle state, the operate-to-speak stop determination mode is set as the voice mode. On the other hand, if the time length that takes the user to execute the start operation does not reach the preset threshold, a mis-operation is determined, it is determined that the user executing the operation of activating the operate-to-speak stop determination mode in the voice input interface is not detected, and the voice mode is not switched.

The control method provided in this embodiment can be applied to various operation scenarios of starting the operate-to-speak stop determination mode. For example, if the start operation of activating the operate-to-speak stop determination mode is a press-down operation to the microphone button, the operation of activating the operate-to-speak stop determination mode is to press down the microphone button within a preset threshold, and the preset threshold is the time length of pressing down the microphone button. For another example, if the start operation of activating the operate-to-speak stop determination mode is a click operation to the microphone button, the operation of activating the operate-to-speak stop determination mode is to click the microphone button within a preset threshold, and the preset threshold is the time length of clicking the microphone button. For a further example, if the start operation of activating the operate-to-speak stop determination mode is a sliding operation to the microphone button from the left to the right side of the screen, the operation of activating the operate-to-speak stop determination mode is to keep the microphone button on the right side of the screen within a preset threshold, and the preset threshold is the time length of keeping the microphone button on the right side of the screen.

During implementation, the preset threshold can be set flexibly, the preset thresholds corresponding to different operations of starting the operate-to-speak stop determination mode may be different, e.g., the preset threshold of the time length of pressing down the microphone button may be 1 second; the preset threshold of the time length of clicking the microphone button may be 2 seconds; and the preset threshold of the time length of sliding the microphone button may be 3 seconds, etc.

In this embodiment, the start operation of ending the operate-to-speak stop determination mode is used as a node for screening the user behavior while the start operation of activating the operate-to-speak stop determination mode is used as another node for screening the user behavior.

Figure 5:
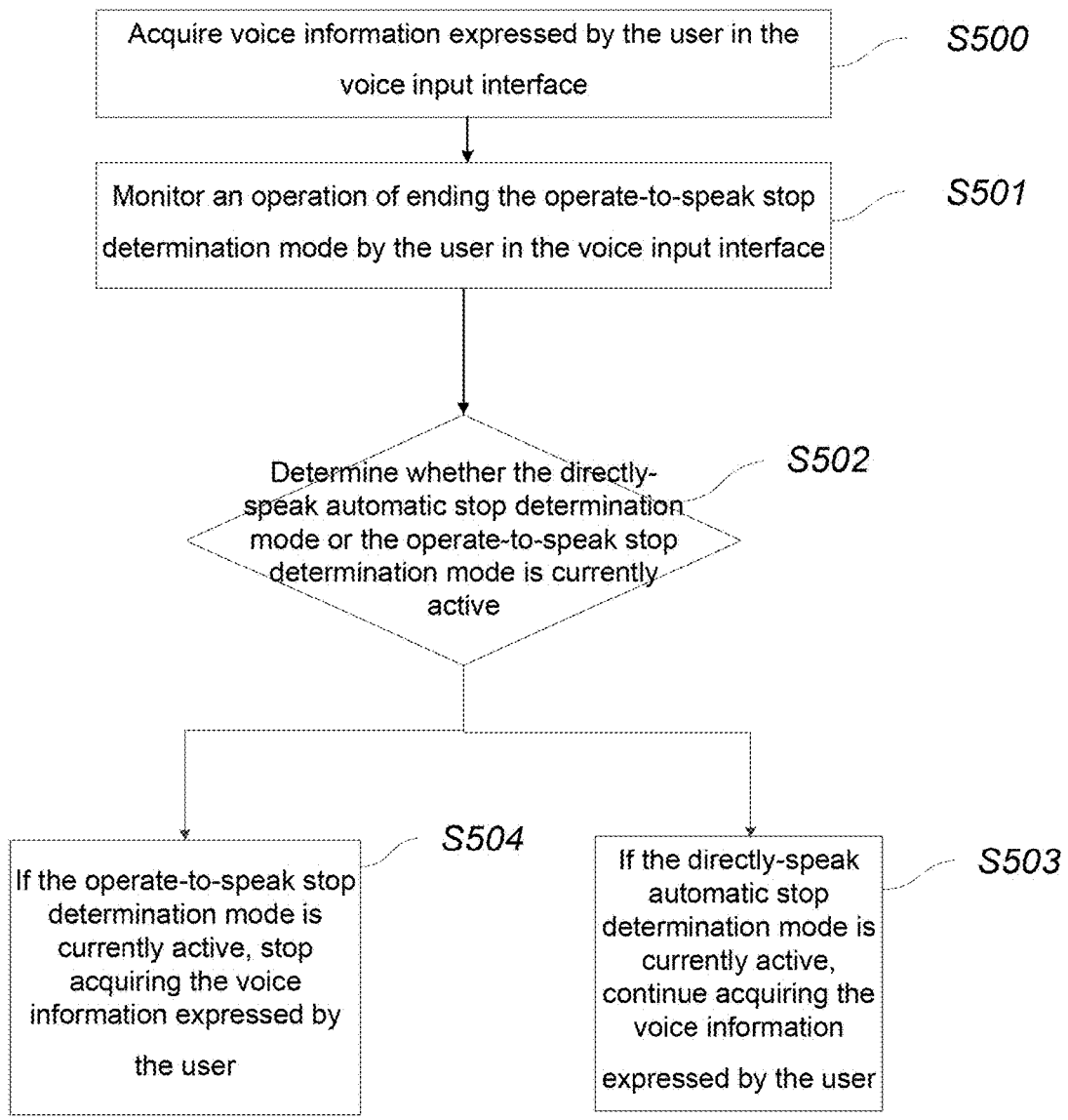
FIG. 5 shows a schematic flow diagram of a control method of ending an operate-to-speak stop determination mode, consistent with exemplary embodiments of the present disclosure.

As shown in FIG. 5, the method further includes the following steps.

Step S500 includes: acquiring voice information expressed by the user in the voice input interface.

When the user inputs voice in the voice input interface, the microphone is in a busy state, the voice mode is in an operate-to-speak stop determination mode or a directly-speak automatic stop determination mode, and the voice information expressed by the user in the operate-to-speak stop determination mode or the directly-speak automatic stop determination mode is acquired.

Step S501 includes: monitoring an operation of ending the operate-to-speak stop determination mode by the user in the voice input interface.

In some embodiments, according to different start operations executed by the user to start the operate-to-speak stop determination mode, the operation of ending the operate-to-speak stop determination mode can be implemented in various ways. For example, if the start operation is a press-down operation to a press-to-speak button, as shown in FIG. 13, the operate-to-speak voice input mode is to press down the press-to-speak button for voice input. Correspondingly, the operation of ending the operate-to-speak stop determination mode is to release the press-to-speak button, as shown in FIG. 14. For another example, if the start operation of activating the operate-to-speak stop determination mode is a click operation to the microphone button, as shown in FIG. 16, the operate-to-speak voice input mode is to click the microphone button for voice input. Correspondingly, the operation of ending the operate-to-speak stop determination mode is a click to cancel the selected microphone button, as shown in FIG. 17. For a further example, if the start operation of activating the operate-to-speak stop determination mode is to slide from an initial position to a final position, e.g., slide from left to right, the operate-to-speak voice input mode is to carry out voice input after sliding from left to right. Correspondingly, the operation of ending the operate-to-speak stop determination mode is to slide from the final position to the initial position, e.g., slide from right to left.

Figure 19:
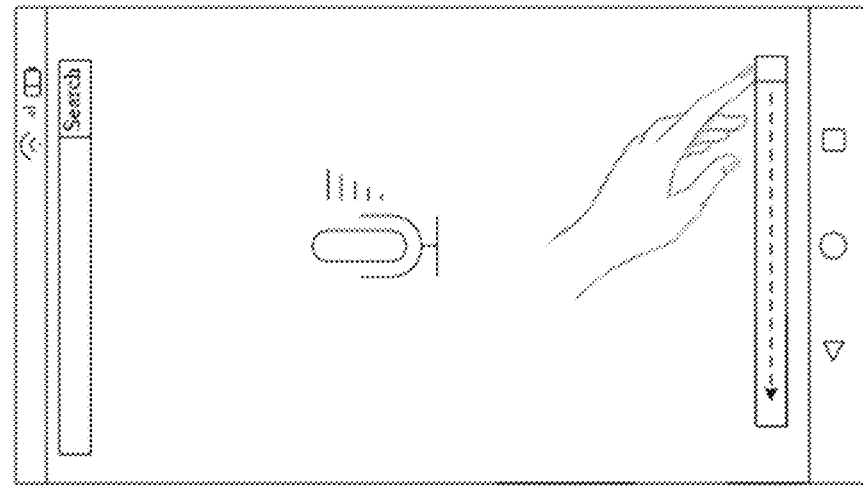
FIG. 19 shows a schematic diagram of another interactive interface for ending the operate-to-speak stop determination mode, consistent with exemplary embodiments of the present disclosure.
Figure 22:
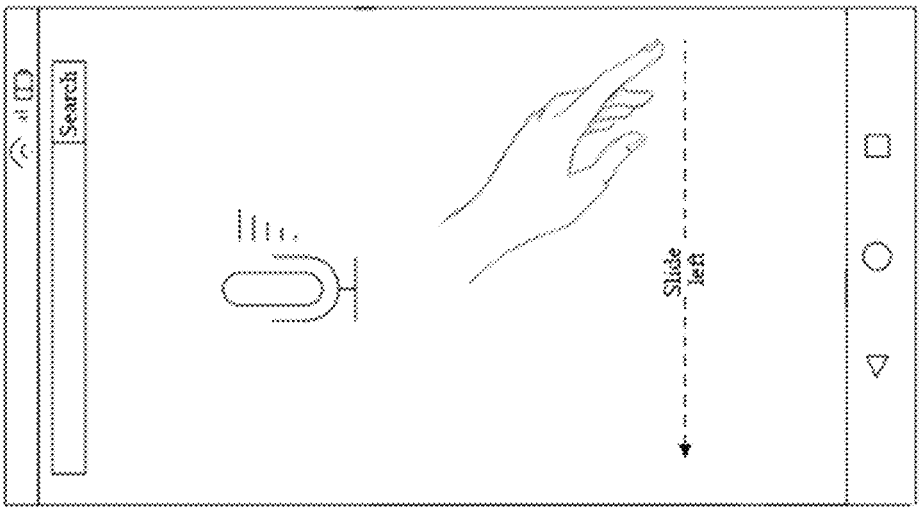
FIG. 22 shows a schematic diagram of another interactive interface for ending the operate-to-speak stop determination mode, consistent with exemplary embodiments of the present disclosure.

The start operation of activating the operate-to-speak stop determination mode is to slide from the initial position to the final position in multiple implementation modes, for example, the start operation is a gesture, e.g., the finger of the user or the electromagnetic pen operated by the user slides from any position on the left side of the screen to any position on the right side of the screen, as shown in FIG. 21. Correspondingly, the operation of ending the operate-to-speak stop determination mode is implemented when the finger of the user or the electromagnetic pen slides from any position of the right side of the screen to any position of the left side of the screen, as shown in FIG. 22. For another example, the screen has a microphone button and a sliding bar for sliding the microphone button, the start operation of activating the operate-to-speak stop determination mode is to drag the microphone button from one position in the sliding bar to the other position, as shown in FIG. 18. Correspondingly, the operation of ending the operate-tospeak stop determination mode is to drag the microphone button to the initial position, as shown in FIG. 19.

Step S502 includes: in response to detecting that the user has executed the operation of ending the operate-to-speak stop determination mode, determining whether the directly-speak automatic stop determination mode or the operate-to-speak stop determination mode is currently active. Step S503 includes: if the directly-speak automatic stop determination mode is currently active, continuing acquiring the voice information expressed by the user; and step S504 includes: if the operate-to-speak stop determination mode is currently active, stopping acquiring the voice information expressed by the user.

In some embodiments, FIGS. 15, 20, and 23 are schematic diagrams describing that the user executing the start operation of activating the operate-to-speak stop determination mode in the busy state of the microphone.

In some embodiments, when the user enters the voice input interface and before the voice input of the user is detected, the voice mode may not be set. That is, when the voice input of the user is not detected, the voice mode is neither in the directly-speak automatic stop determination mode nor the operate-to-speak stop determination mode. When user's voice is detected, the voice mode is set according to whether the user has executed the operation of activating the operate-to-speak stop determination mode. If voice is detected but the operation of activating the operate-to-speak stop determination mode is not detected, the directly-speak automatic stop determination mode is set as the voice mode; if voice is detected and the operation of activating the operate-to-speak stop determination mode is detected, the operate-to-speak stop determination mode is set as the voice mode.

In order to prevent mis-operation and ensure the integrity of the acquired voice information, in another mode, when user's voice is detected in the voice input interface, the directly-speak automatic stop determination mode is set as the voice mode regardless whether the user operates the microphone button. Thus, the device may also be defaulted during implementation, e.g., when the user enters the voice input interface, the directly-speak automatic stop determination mode is defaulted as the voice mode, then whether the user has executed the start operation of activating the operate-to-speak stop determination mode and the time length of executing the start operation are monitored, the voice mode is switched from the directly-speak automatic stop determination mode to the operate-to-speak stop determination mode when the time length reaches a preset threshold, otherwise, the directly-speak automatic stop determination mode continues.

In the dual-mode voice control method described above, the current voice input behavior of the user is accurately screened via two nodes, the two nodes are respectively the start operation of activating the operate-to-speak stop determination mode and ending the operate-to-speak stop determination mode. And the voice mode is automatically switched to the corresponding voice input support according to the state of the microphone and the voice input mode when different operations are detected, so that the voice input habits of different users are adapted, and the voice usage requirements of different behaviors can be met.

In the dual-mode voice control method provided in the first embodiment, when the start operation of activating the operate-to-speak stop determination mode is detected, the voice mode enters the directly-speak automatic stop determination mode, and when the time length of executing the start operation reaches the preset threshold, the voice mode is switched from the directly-speak automatic stop determination mode to the operate-to-speak stop determination mode, so that the integrity of acquired voice information is ensured and the effects of mis-operation are effectively avoided.

Figure 6:
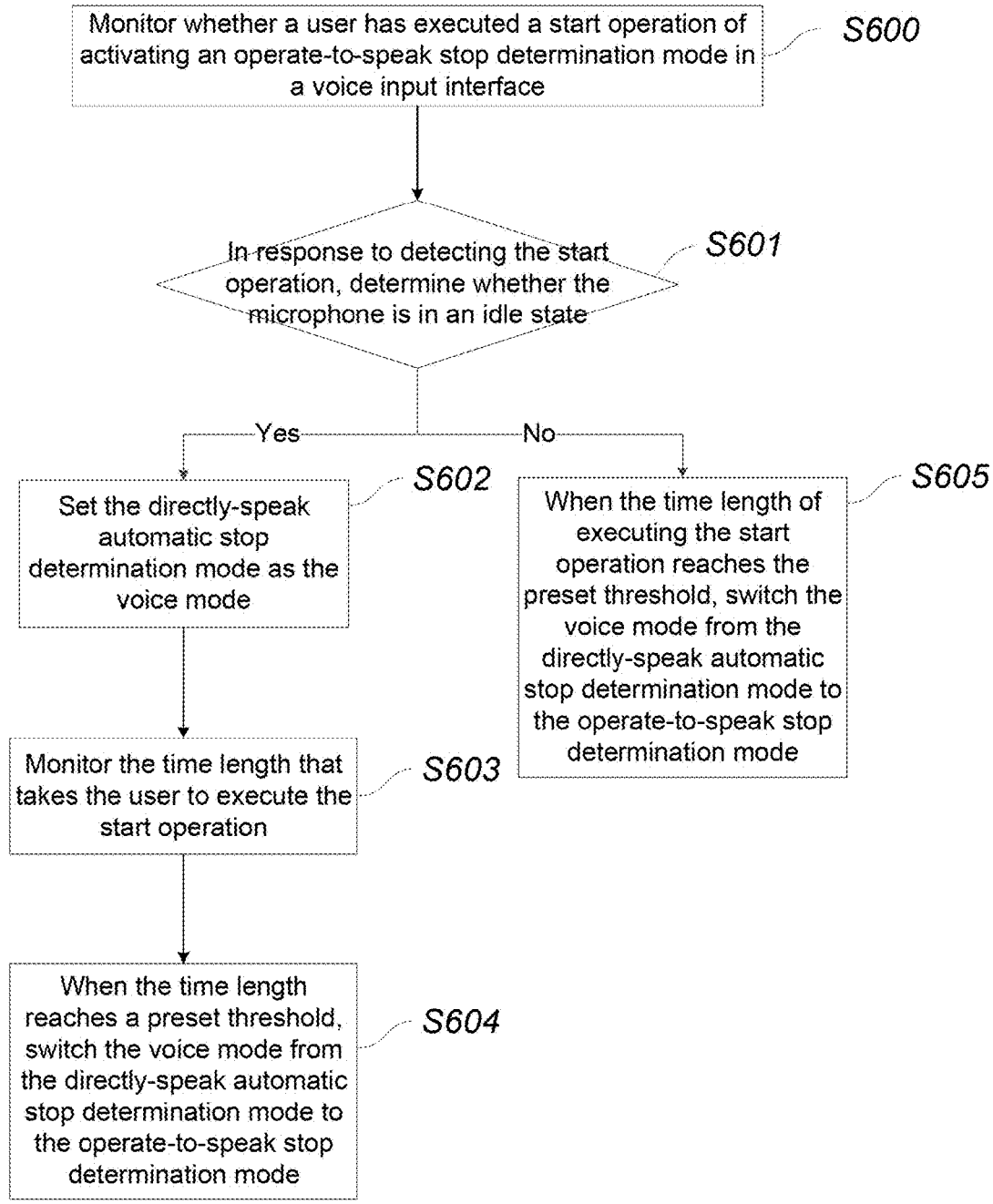
FIG. 6 shows a schematic flow diagram of a dual-mode voice control method, consistent with exemplary embodiments of the present disclosure.

FIG. 6 shows a dual-mode voice control method provided by some embodiments of the present disclosure. As shown in FIG. 6, the control method flow may be implemented by a browser in a user terminal or a voice function module such as an audio module in application software, and the method includes the following steps:

Step S600 includes: monitoring whether a user has executed a start operation of activating an operate-to-speak stop determination mode in a voice input interface.

In some embodiments, the user may execute the start operation of activating the operate-to-speak stop determination mode in multiple implementations. For example, the start operation is a press-down operation to a press-to-speaker button, as shown in FIG. 13. For another example, the start operation is a click operation to a microphone button, as shown in FIG. 16. For a further example, the start operation is a sliding operation from an initial position to a final position, e.g., sliding from left to right, etc.

The microphone button is shown in multiple forms, for example, shown as a microphone button icon, e.g., a microphone icon is set in the middle of an area, and voice input can begin by long-pressing or selecting the microphone icon, as shown in FIGS. 16 and 17; for another example, shown as a long-press button, of which a press-to-speak label or the like is marked in a rectangular button, and voice input can begin by long-pressing the button, as shown in FIGS. 13 and 15.

It can be known from the above description that the start operation of activating the operate-to-speak stop determination mode can be used as a node for screening the user behavior.

Step S601 includes: in response to detecting the start operation, determining whether the microphone is in an idle state; if yes, step S602 is executed: setting the directly-speak automatic stop determination mode as the voice mode; step S603 includes: monitoring the time length that takes the user to execute the start operation; and step 604 includes: when the time length reaches a preset threshold, determining that the operation of activating the operate-to-speak stop determination mode in the voice input interface is detected, and switching the voice mode from the directly-speak automatic stop determination mode to the operate-to-speak stop determination mode. If the response to step S601 is no, step S605 is executed: when the time length of executing the start operation reaches the preset threshold, switching the voice mode from the directly-speak automatic stop determination mode to the operate-to-speak stop determination mode.

Detecting the start operation indicates the moment when the user's operation of activating the operate-to-speak stop determination mode appears. Taking the press-to-speak operation mode as an example, detecting the start operation in this step indicates the moment when the finger of the user presses down the microphone button, and the user did not operate the microphone button before the moment when the finger of the user pressed down the microphone button.

The idle state of the microphone indicates a non-recording state when no voice description is received. In some embodiments, no microphone recording icon is in the screen in the idle state of the microphone.

In some embodiments, if the microphone is in the idle state, the current voice mode is neither the directly-speak automatic stop determination mode nor the operate-to-speak stop determination mode. Monitoring the start operation of activating the operate-to-speak stop determination mode in the idle state indicates that the user prepares for voice input.

Since user's mis-operation may exist, in this step, when the start operation is detected, e.g., when the microphone button is pressed down and the microphone is in the idle state, the directly-speak automatic stop determination mode is set as the voice mode, and then the voice information described by the user is acquired in the directly-speak automatic stop determination mode, so that interferences caused by the mis-operation can be avoided, and the voice information can be completely acquired.

When the start operation is detected and the microphone is in the idle state, a mis-operation is determined by monitoring the time length during which the user executes the start operation, e.g., the time length during which the user presses down the microphone button, while the directly-speak automatic stop determination mode is set as the voice mode. When the time length during which the user executes the start operation, e.g., the time length during which the user presses down the microphone button, is determined to reach a preset threshold, a correct operation can be determined, then it is determined that the user has executed the operation of activating the operate-to-speak stop determination mode in the voice input interface, and the voice mode is switched from the directly-speak automatic stop determination mode to the operate-to-speak stop determination mode. On the other hand, if the time length during which the user executes the start operation does not reach the preset threshold, a mis-operation is determined, it is determined that the user has not executed the operation of activating the operate-to-speak stop determination mode in the voice input interface, and the voice mode is not switched.

In some embodiments, the user's operation of ending the operate-to-speak stop determination mode is used as the other node for screening the user behavior.

The method further includes: acquiring voice information expressed by the user in the voice input interface; monitoring an operation of ending the operate-to-speak stop determination mode by the user in the voice input interface; when detecting that the user executes the operation of ending the operate-to-speak stop determination mode, determining whether the directly-speak automatic stop determination mode or the operate-to-speak stop determination mode is currently active; if the directly-speak automatic stop determination mode is currently active, continuing acquiring the voice information expressed by the user; and if the operate-to-speak stop determination mode is currently active, stopping acquiring the voice information expressed by the user, as shown in FIG. 5.

In some embodiments, according to different start operations, executed by the user, of activating the operate-to-speak stop determination mode, the operation of ending the operate-to-speak stop determination mode is implemented in various ways. For example, if the start operation is a press-down operation to a press-to-speak button, as shown in FIG. 13, the operate-to-speak voice input mode is to press down the press-to-speak button for voice input. Correspondingly, the operation of ending the operate-to-speak stop determination mode is to release the press-to-speak button, as shown in FIG. 14. For another example, if the start operation of activating the operate-to-speak stop determination mode is a click operation to the microphone button, as shown in FIG. 16, the operate-to-speak voice input mode is to click the microphone button for voice input. Correspondingly, the operation of ending the operate-to-speak stop determination mode is a click operation to cancel the selected microphone button, as shown in FIG. 17. For a further example, if the start operation of activating the operate-to-speak stop determination mode is to slide from an initial position to a final position, e.g., slide from left to right, the operate-to-speak voice input mode is to carry out voice input after sliding from left to right. Correspondingly, the operation of ending the operate-to-speak stop determination mode is to slide from the final position to the initial position, e.g., slide from right to left.

The start operation of activating the operate-to-speak stop determination mode by sliding from the initial position to the final position has multiple implementation modes. For example, the start operation is a gesture action, e.g., the finger of the user or the electromagnetic pen operated by the user slides from any position of the left side of the screen to any position of the right side of the screen, as shown in FIG. 21, and correspondingly, the operation of ending the operate-to-speak stop determination mode is implemented when the finger of the user or the electromagnetic pen slides from any position of the right side of the screen to any position of the left side of the screen, as shown in FIG. 22. For another example, the screen has a microphone button and a sliding bar for sliding the microphone button, the start operation of activating the operate-to-speak stop determination mode is to drag the microphone button from one position in the sliding bar to the other position, as shown in FIG. 18. Correspondingly, the operation of ending the operate-to-speak stop determination mode is to drag the microphone button to the initial position, as shown in FIG. 19.

In some embodiments, the stop determination rule of the operate-to-speak stop determination mode is that stop is determined when an operation of ending the operate-to-speak stop determination mode as opposed to an operation of activating the operate-to-speak stop determination mode is detected, e.g., stop is determined when operations as a finger or an electromagnetic pen releasing a press-to-speak button, an uncheck-microphone button being clicked, the microphone button being slided to a starting point and the like are monitored, regardless of whether the user inputs a voice description. Using the operation of pressing down the press-to-speak button to input voice and releasing the press-to-speak button to end voice input as an example, in this operate-to-speak stop determination mode, as long as the user presses down the speaking button, the voice mode is in the state of acquiring voice information described by the user any time regardless whether the user inputs a voice.

The stop determination rule of the directly-speak automatic stop determination mode is that stop is determined if voice information described by the user is not detected for a certain time length, regardless of whether the user carries out an operation.

In the dual-mode voice control method described above, when the user executing the start operation of activating the operate-to-speak stop determination mode is detected, the voice mode enters the directly-speak automatic stop determination mode, and when the time length of executing the start operation reaches the preset threshold, the voice mode is switched from the directly-speak automatic stop determination mode to the operate-to-speak stop determination mode, so that the integrity of acquired voice information is ensured and the effect of mis-operations is effectively avoided.

In some embodiments, for the methods of entering the voice input interface, triggering the operate-to-speak stop determination mode, executing the start operation, setting and switching the voice mode and the like, reference may be made to the descriptions in the first embodiment, which are not repeated here.

Figure 7:
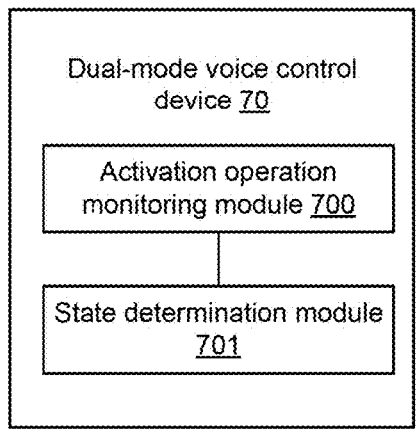
FIG. 7 shows a structure block diagram of a dual-mode voice control device, consistent with exemplary embodiments of the present disclosure.

FIG. 7 shows a structure block diagram of a dual-mode voice control device 70 provided by some embodiments of the present disclosure. As shown in FIG. 7, the device 70 may be implemented as a browser in a user terminal or a voice function module such as an audio module in application software. The dual-mode voice control device 70 supports a directly-speak automatic stop determination mode and an operate-to-speak stop determination mode during voice input, and the device includes:

an activation operation monitoring module 700 configured to determine whether a user has executed an operation of activating an operate-to-speak stop determination mode in a voice input interface; and a state determination module 701 configured to, when the activation operation monitoring module 700 determines that the user has executed the operation of activating the operate-to-speak stop determination mode, determine whether a microphone is in a busy state, and if so, switch a voice mode from a directly-speak automatic stop determination mode to the operate-to-speak stop determination mode. And before the user executes the operation of activating the operate-to-speak stop determination mode, if the microphone is in the busy state, the voice mode is the directly-speak automatic stop determination mode.

Figure 8:
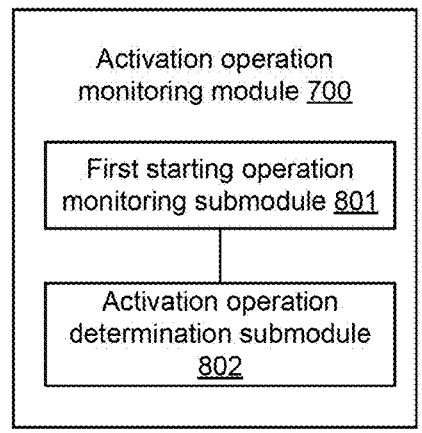
FIG. 8 shows a structure block diagram of another dual-mode voice control device, consistent with exemplary embodiments of the present disclosure.

In some embodiments, as shown in FIG. 8, the activation operation monitoring module 700 may include:

a first start operation monitoring submodule 801 configured to monitor whether a user has executed a start operation of activating an operate-to-speak stop determination mode in a voice input interface; and an activation operation determination submodule 802 configured to, when the first start operation monitoring submodule 801 detects the start operation, monitor the time length during which the user executes the start operation, and when the time length reaches a preset threshold, determine that the operation of activating the operate-to-speak stop determination mode in the voice input interface is detected.

Figure 9:
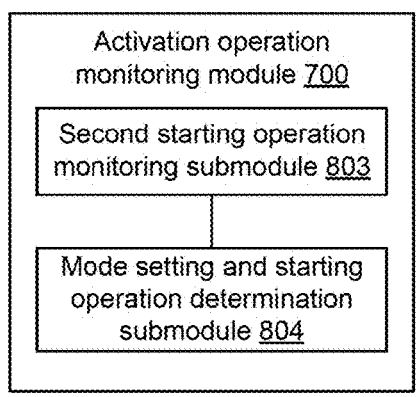
FIG. 9 shows a structure block diagram of another dual-mode voice control device, consistent with exemplary embodiments of the present disclosure.

In some embodiments, as shown in FIG. 9, the activation operation monitoring module 700 may include:

a second start operation monitoring submodule 803 configured to, monitor whether a user has executed a start operation of activating an operate-to-speak stop determination mode in a voice input interface; and a mode setting and starting operation determination submodule 804 configured to, when the second start operation monitoring submodule 803 detects the start operation, determine whether a microphone is in an idle state, if so, set a directly-speak automatic stop determination mode as the voice mode, monitor the time length during which the user executes the start operation, and when the time length reaches a preset threshold, determine that the operation of activating the operate-to-speak stop determination mode in the voice input interface is detected.

Figure 10:
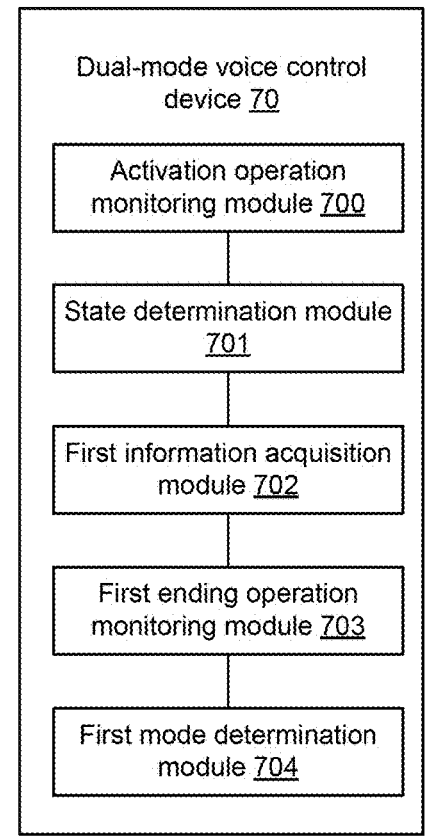
FIG. 10 shows a structure block diagram of another dual-mode voice control device, consistent with exemplary embodiments of the present disclosure.

Further, as shown in FIG. 10, the dual-mode voice control device 70 further includes:

a first information acquisition module 702 configured to acquire voice information expressed by the user in the voice input interface;

a first ending operation monitoring module 703 configured to monitor an operation of ending the operate-to-speak stop determination mode by the user in the voice input interface; and a first mode determination module 704 configured to, when the first ending operation monitoring module 703 determines that the user has executed the operation of ending the operate-to-speak stop determination mode, determining whether the directly-speak automatic stop determination mode or the operate-to-speak stop determination mode is currently active. If the directly-speak automatic stop determination mode is currently active, the first information acquisition module 702 continues to acquire the voice information expressed by the user; and if the operate-to-speak stop determination mode is currently active, the first information acquisition module 702 stops acquiring the voice information expressed by the user.

The implementation principle and the technical effects of the dual-mode voice control device 70 provided by the embodiments of the present disclosure are similar to the embodiments described above.

Figure 11:
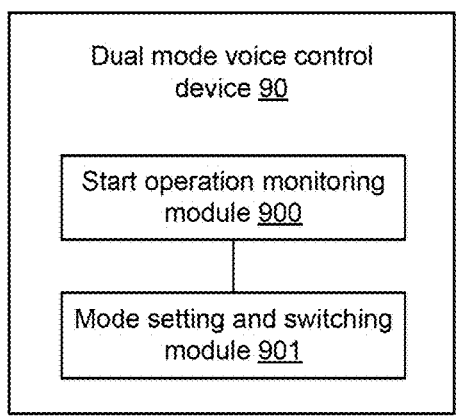
FIG. 11 shows a structure block diagram of a dual-mode voice control device, consistent with exemplary embodiments of the present disclosure.

FIG. 11 shows a structure block diagram of a dual-mode voice control device 90 provided by some embodiments of the present disclosure. As shown in FIG. 11, the device 90 may be implemented as a browser in a user terminal or a voice function module such as an audio module in application software. The dual-mode voice control device 90 supports a directly-speak automatic stop determination mode and an operate-to-speak stop determination mode during voice input, and the device in this embodiment includes:

a start operation monitoring module 900 configured to, monitor whether a user executes a start operation of activating an operate-to-speak stop determination mode in a voice input interface; and a mode setting and switching module 901 configured to, when the start operation monitoring module 900 detects the start operation, determine whether a microphone is in an idle state, if so, set a directly-speak automatic stop determination mode as the voice mode, enabling the start operation monitoring module 900 to monitor the time length during which the user executes the start operation, and when the time length reaches a preset threshold, determine that the operation of activating the operate-to-speak stop determination mode in the voice input interface is detected, and switch the voice mode from the directly-speak automatic stop determination mode to the operate-to-speak stop determination mode.

Figure 12:
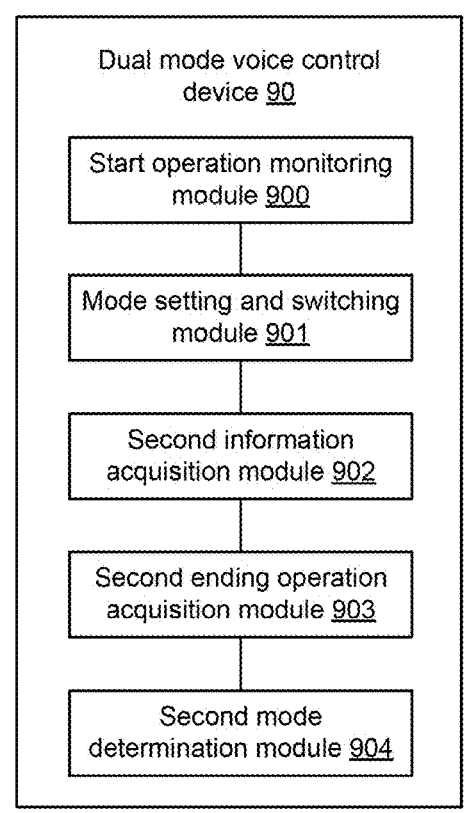
FIG. 12 shows a structure block diagram of another dual-mode voice control device, consistent with exemplary embodiments of the present disclosure.

Further, as shown in FIG. 12, the dual-mode voice control device 90 further includes:

a second information acquisition module 902 configured to acquire voice information expressed by the user in the voice input interface;

a second ending operation monitoring module 903 configured to monitor an operation of ending the operate-to-speak stop determination mode by the user in the voice input interface; and a second mode determination module 904 configured to, when the second ending operation monitoring module 903 detects that the user has executed the operation of ending the operate-to-speak stop determination mode, determine whether the directly-speak automatic stop determination mode or the operate-to-speak stop determination mode is currently active; if the directly-speak automatic stop determination mode is currently active, the second information acquisition module 902 continues to acquire the voice information expressed by the user; and if the operate-to-speak stop determination mode is currently active, the second information acquisition module 902 stops acquiring the voice information expressed by the user.

The implementation principle and the technical effects of the dual-mode voice control device 90 provided by the embodiments of the present disclosure are similar to the embodiments described above.

In addition, the flow diagrams and the block diagrams in the accompanying drawings show system architectures, functions and operations which may be achieved according to the devices, the methods and the computer program products of multiple embodiments of the present disclosure. In this regard, each block in the flow diagrams or the block diagrams may represent a part of a module, a program segment or a code, and the part of the module, the program segment or the code includes one or more executable instructions for realizing logical functions. In some alternative implementations, the functions labeled in the blocks may also occur in sequence different from that in the drawings. For example, two continuing blocks may be executed in parallel substantially or executed in opposite sequence sometimes, which depends on the involved functions. In some embodiments, each block in the block diagrams and/or flow diagrams and a combination of the blocks in the block diagrams and/or flow diagrams may be implemented by a dedicated hardware-based system for executing functions or actions, or implemented by a combination of dedicated hardware and computer instructions.

The computer program products provided by some embodiments of the present disclosure include computer-readable storage media storing program codes, the instructions included in the program codes may be used for executing the methods in the above method embodiments, and reference may be made to the method embodiments for implementations, which are not repeated herein.

In the several embodiments provided in the present application, it shall be understood that the disclosed devices and methods may be implemented in other modes. The above-described device embodiments are only exemplary, for example, the division of the modules is only a logic function division, other division modes may be adopted in practice, for another example, a plurality of modules or components may be combined or integrated to another device, or some characteristics may be omitted or are not executed. From another point of view, the displayed or discussed mutual coupling or direct coupling or communication connection may be indirect coupling or communication connection of devices or modules through some communication interfaces, and may also be in electrical, mechanical or other forms.

The modules illustrated as separate components may be or may not be physically separated, and the components displayed as modules may be or may not be physical modules, that is to say, the components may be positioned at one place or may also be distributed on a plurality of network modules. The objectives of the solutions of some embodiments may be fulfilled by selecting part of or all of the modules according to actual needs.

In addition, in various embodiments of the present disclosure, the functional modules may be integrated in one processing module, or the function modules may separately and physically exist, or two or more modules may be integrated in one module.

When the functions are achieved in the form of software functional modules and sold or used as independent products, the functions may be stored in a computer-readable storage medium. Based on such an understanding, the technical solutions of the present disclosure substantially, or the part of the present disclosure, or a part of the technical solutions may be embodied in the form of a software product, and the computer software product is stored in a storage medium, which includes a plurality of instructions enabling computer equipment (which may be a personal computer, a server, or network equipment and the like) to execute all of or part of the steps in the methods of some embodiments of the present disclosure. The aforementioned storage medium includes: various media capable of storing program codes, such as a U disk, a mobile hard disk, a read-only memory (ROM), a random access memory (RAM), a disk or an optical disk.

It should be noted that, in the description, such relation terms as first and second are merely used for distinguishing one entity or operation from the other entity or operation, rather than requiring or hinting any practical relation or sequence among these entities or operations. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or terminal devices. In the absence of more limitations, the factors defined by the statement "include one . . . " do not exclude other identical factors in the processes, methods, articles or terminal devices including said factors.

Described above are embodiments of the present disclosure only, and the present disclosure is not limited thereto. Variable modifications and changes may be made to the present disclosure for those skilled in the art. Any modification, equivalent substitution, improvement and the like made within the spirit and principle of the present disclosure shall fall into the protection scope of the present disclosure. It should be noted that similar signs and letters express similar items in the following accompanying drawings, thus, once a certain item is defined in one drawing, it does not need to be further defined or interpreted in the following drawings.

What is claimed is:

1. A dual-mode voice control method, comprising:
determining whether a user has executed an operation of activating a manual speak stop determination mode in a voice input interface, wherein during the manual speak stop determination mode, stop of voice input is determined based on a user operation of ending the manual speak stop determination mode, regardless of whether the user carries out voice input at a microphone;
determining that the user has executed the operation of activating the manual speak stop determination mode while the microphone is in a busy state, wherein the voice input interface is in an automatic speak stop determination when the microphone is in the busy state, wherein during the automatic speak stop determination mode, stop of voice input is determined based on no voice input for a certain length of time; and
in response to determining that the user has executed the operation of activating the manual speak stop determination mode while the microphone is in the busy state, switching a voice mode of the voice input interface from the automatic speak stop determination mode to the manual speak stop determination mode such that stop of voice input is determined based on the user operation of ending the manual speak stop determination mode instead of based on no voice input for the certain length of time.

2. The method of claim 1, wherein determining whether the user has executed the operation of activating the manual speak stop determination mode in the voice input interface comprises:

determining whether the user has executed a start operation of activating the manual speak stop determination mode in the voice input interface;

in response to detecting the start operation, monitoring the time length during which the user executes the start operation; and in response to determining that the time length reaches a preset threshold, determining that the operation of activating the manual speak stop determination mode in the voice input interface is detected.

3. The method of claim 1, wherein determining whether the user has executed the operation of activating the manual speak stop determination mode in the voice input interface comprises:

determining whether the user has executed a start operation of activating the manual stop determination mode in the voice input interface;

in response to determining the start operation, determining whether the microphone is in an idle state; and in response to determining that the microphone is in the idle state, setting the automatic speak stop determination mode as the voice mode, monitoring the time length during which the user executes the start operation, and in response to determining that the time length reaches a preset threshold, determining that the operation of activating the manual speak stop determination mode in the voice input interface is detected.

4. The method of claim 3, further comprising:

acquiring voice information expressed by the user in the voice input interface;

monitoring an operation of ending the manual speak stop determination mode by the user in the voice input interface;

in response to determining that the user has executed the operation of ending the manual speak stop determination mode, determining whether the automatic speak stop determination mode or the manual speak stop determination mode is currently active;

in response to determining that the automatic speak stop determination mode is currently active, continuing acquiring the voice information expressed by the user; and in response to determining that the manual speak stop determination mode is currently active, stopping acquiring the voice information expressed by the user.

5. A dual-mode voice control method, comprising:

determining whether a user has executed a start operation of an operation of activating a manual speak stop determination mode in a voice input interface, wherein during the manual speak stop determination mode, stop of voice input is determined based on a user operation of ending the manual speak stop determination mode, regardless of whether the user carries out voice input at a microphone;

determining that the user has executed the start operation of activating the manual speak stop determination mode while the microphone is in an idle state;

in response to determining that the user has executed the start operation of activating the manual speak stop determination mode while the microphone is in the idle state, setting an automatic speak stop determination mode as the voice mode of the voice input interface, and monitoring the time length during which the user executes the start operation, wherein during the automatic speak stop determination mode, stop of voice input is determined based on no voice input for a certain length of time; and in response to determining that the time length reaches a preset threshold, determining that the operation of activating the manual speak stop determination mode in the voice input interface is detected, and switching the voice mode of the voice input interface from the automatic speak stop determination mode to the manual speak stop determination mode such that stop of voice input is determined based on the user operation of ending the manual speak stop determination mode instead of based on no voice input for the certain length of time.

6. The method of claim 5, further comprising:

acquiring voice information expressed by the user in the voice input interface;

monitoring an operation of ending the manual speak stop determination mode by the user in the voice input interface;

in response to determining that the user has executed the operation of ending the manual speak stop determination mode, determining whether the automatic speak stop determination mode or the manual speak stop determination mode is currently active;

in response to determining that the automatic speak stop determination mode is currently active, continuing acquiring the voice information expressed by the user; and in response to determining that the manual speak stop determination mode is currently active, stopping acquiring the voice information expressed by the user.

7. A dual-mode voice control device operable in a user terminal, the device comprising:

a processor; and a non-transitory computer-readable memory storing instructions that, when executed by the processor, cause the processor to:

monitor whether a user has executed an operation of activating a manual speak stop determination mode in a voice input interface, wherein during the manual speak stop determination mode, stop of voice input is determined based on a user operation of ending the manual speak stop determination mode, regardless of whether the user carries out voice input at a microphone; and determining that the user has executed the operation of activating the manual speak stop determination mode while the microphone is in a busy state, wherein the voice input interface is in an automatic speak stop determination when the microphone is in the busy state, wherein during the automatic speak stop determination mode, stop of voice input is determined based on no voice input for a certain length of time; and in response to determining that that the user has executed the operation of activating the manual speak stop determination mode while the microphone is in the busy state, switching a voice mode of the voice input interface from the automatic speak stop determination mode to the manual speak stop determination mode such that stop of voice input is determined based on the user operation of ending the manual speak stop determination mode instead of based on no voice input for the certain length of time.

8. The device of claim 7, wherein, to monitor whether the user has executed the operation of activating the manual speak stop determination mode in the voice input interface, the instructions, when executed by the processor, are configured to cause the processor to:

determine whether the user has executed a start operation of activating the manual speak stop determination mode in the voice input interface; and in response to determining the start operation, monitor the time length during which the user executes the start operation, and when the time length reaches a preset threshold, determine that the operation of activating the manual speak stop determination mode in the voice input interface is detected.

9. The device of claim 7, wherein, to monitor whether the user has executed the operation of activating the manual speak stop determination mode in the voice input interface, the instructions, when executed by the processor, are configured to cause the processor to:

determine whether the user has executed a start operation of activating the manual speak stop determination mode in the voice input interface;

in response to determining the start operation, determine whether a microphone is in an idle state; and in response to determining the microphone is in the idle state, set the automatic speak stop determination mode as the voice mode, monitor the time length during which the user executes the start operation, and when the time length reaches a preset threshold, determine that the operation of activating the manual speak stop determination mode in the voice input interface is detected.

10. The device of claim 9, wherein the instructions, when executed by the processor, are further configured to cause the processor to:

acquire voice information expressed by the user in the voice input interface;

monitor an operation of ending the manual speak stop determination mode by the user in the voice input interface;

in response to determining that the user has executed the operation of ending the manual speak stop determination mode, determine whether the automatic speak stop determination mode or the manual speak stop determination mode is currently active;

in response to determining that the automatic speak stop determination mode is currently active, continue acquiring the voice information expressed by the user; and in response to determining that the manual speak stop determination mode is currently active, stop acquiring the voice information expressed by the user.

11. A dual-mode voice control device operable in a user terminal, the device comprising:

a processor; and a non-transitory computer-readable memory storing instructions that, when executed by the processor, cause the processor to:

determine whether a user has executed a start operation of activating a manual speak stop determination mode in a voice input interface, wherein during the manual speak stop determination mode, stop of voice input is determined based on a user operation of ending the manual speak stop determination mode, regardless of whether the user carries out voice input at a microphone;

determine that the user has executed the start operation of activating the manual speak stop determination mode while the microphone is in an idle state;

in response to determining that the user has executed the start operation of activating the manual speak stop determination mode while the microphone is in the idle state:

set an automatic speak stop determination mode as the voice mode of the voice input interface, wherein during the automatic speak stop determination mode, stop of voice input is determined based on no voice input for a certain length of time, monitor the time length during which the user executes the start operation, and when the time length reaches a preset threshold, determine that the operation of activating the manual speak stop determination mode in the voice input interface is detected, and switch the voice mode of the voice input interface from the automatic speak stop determination mode to the manual speak stop determination mode such that stop of voice input is determined based on the user operation of ending the manual speak stop determination mode instead of based on no voice input for the certain length of time.

12. The device of claim 11, wherein the instructions, when executed by the processor, are further configured to cause the processor to:

acquire voice information expressed by the user in the voice input interface;

monitor an operation of ending the manual speak stop determination mode by the user in the voice input interface;

in response to determining that the user has executed the operation of ending the manual speak stop determination mode, determine whether the automatic speak stop determination mode or the manual speak stop determination mode is currently active;

in response to determining that the automatic speak stop determination mode is currently active, continue acquiring the voice information expressed by the user; and in response to determining that the manual speak stop determination mode is currently active, stop acquiring the voice information expressed by the user.

13. A user terminal, comprising:

a microphone, a touch screen, a non-transitory computer-readable memory, and a processor, wherein:

the memory stores instructions that, when executed by the processor, cause the user terminal to:

monitor whether a user has executed an operation of activating a manual speak stop determination mode in a voice input interface, wherein during the manual speak stop determination mode, stop of voice input is determined based on a user operation of ending the manual speak stop determination mode, regardless of whether the user carries out voice input at the microphone; and determining that the user has executed the operation of activating the manual speak stop determination mode while the microphone is in a busy state, wherein the voice input interface is in an automatic speak stop determination when the microphone is in the busy state, wherein during the automatic speak stop determination mode, stop of voice input is determined based on no voice input for a certain length of time; and in response to determining that that the user has executed the operation of activating the manual speak stop determination mode while the microphone is in the busy state, switching a voice mode of the voice input interface from the automatic speak stop determination mode to the manual speak stop determination mode such that stop of voice input is determined based on the user operation of ending the manual speak stop determination mode instead of based on no voice input for the certain length of time.

14. The user terminal of claim 13, wherein, to monitor whether the user has executed the operation of activating the manual speak stop determination mode in the voice input interface, the memory stores instructions that, when executed by the processor, cause the user terminal to:
determine whether the user has executed a start operation of activating the manual speak stop determination mode in the voice input interface; and
in response to determining the start operation, monitor the time length during which the user executes the start operation, and when the time length reaches a preset threshold, determine that the operation of activating the manual peak stop determination mode in the voice input interface is detected.

15. The user terminal of claim 13, wherein, to monitor whether the user has executed the operation of activating the manual speak stop determination mode in the voice input interface, the memory stores instructions that, when executed by the processor, cause the user terminal to:
determine whether the user has executed a start operation of activating the manual speak stop determination mode in the voice input interface; and
in response to determining the start operation, determine whether a microphone is in an idle state,
in response to determining the microphone is in the idle state, set the automatic speak stop determination mode as the voice mode, monitor the time length during which the user executes the start operation, and when the time length reaches a preset threshold, determine that the operation of activating the manual speak stop determination mode in the voice input interface is detected.

16. The user terminal of claim 13, wherein the memory stores instructions that, when executed by the processor, cause the user terminal to:
acquire voice information expressed by the user in the voice input interface;
monitor an operation of ending the manual speak stop determination mode by the user in the voice input interface;
in response to determining that the user has executed the operation of ending the manual speak stop determination mode, determine whether the automatic speak stop determination mode or the manual stop determination mode is currently active;
in response to determining that the automatic speak stop determination mode is currently active, continue acquiring the voice information expressed by the user; and
in response to determining that the manual stop determination mode is currently active, stop acquiring the voice information expressed by the user.

17. A user terminal, comprising:
a microphone, a touch screen, a non-transitory computer-readable memory, and a processor, wherein:
the memory stores instructions that, when executed by the processor, cause the user terminal to:
determine whether a user has executed a start operation of activating a manual speak stop determination mode in a voice input interface, wherein during the manual speak stop determination mode, stop of voice input is determined based on a user operation of ending the manual speak stop determination mode, regardless of whether the user carries out voice input at the microphone;
determine that the user has executed the start operation of activating the manual speak stop determination mode while the microphone is in an idle state;
in response to determining that the user has executed the start operation of activating the manual speak stop determination mode while the microphone is in the idle state:
set an automatic speak stop determination mode as the voice mode of the voice input interface, wherein during the automatic speak stop determination mode, stop of voice input is determined based on no voice input for a certain length of time,
monitor the time length during which the user executes the start operation, and
when the time length reaches a preset threshold, determine that the operation of activating the manual speak stop determination mode in the voice input interface is detected, and switch the voice mode of the voice input interface from the automatic speak stop determination mode to the manual speak stop determination mode such that stop of voice input is determined based on the user operation of ending the manual speak stop determination mode instead of based on no voice input for the certain length of time.

18. The user terminal of claim 17, wherein the memory stores instructions that, when executed by the processor, further cause the user terminal to:
acquire voice information expressed by the user in the voice input interface;
monitor an operation of ending the manual speak stop determination mode by the user in the voice input interface; and
in response to determining that the user has executed the operation of ending the manual speak stop determination mode, determine whether the automatic speak stop determination mode or the manual speak stop determination mode is currently active; in response to determining that the automatic speak stop determination mode is currently active, continue acquiring the voice information expressed by the user; and in response to determining that the manual speak stop determination mode is currently active, stop acquiring the voice information expressed by the user.

* * * * *

UNITED STATES PATENT AND TRADEMARK OFFICE
CERTIFICATE OF CORRECTION

PATENT NO. : 10,373,613 B2
APPLICATION NO. : 15/363990
DATED : August 6, 2019
INVENTOR(S) : Yajun Wang et al.

Page 1 of 1

It is certified that error appears in the above-identified patent and that said Letters Patent is hereby corrected as shown below:

Claim 7, Column 22, Line 53:
"determining that that the user has executed" should read -- determining that the user has executed --.

Claim 13, Column 24, Line 63:
"determining that that the user has executed" should read -- determining that the user has executed --.

Signed and Sealed this
Sixth Day of April, 2021

Drew Hirshfeld
*Performing the Functions and Duties of the
Under Secretary of Commerce for Intellectual Property and
Director of the United States Patent and Trademark Office*